United States Patent [19]
Drutchas

[11] 3,952,827
[45] Apr. 27, 1976

[54] ACCELERATION CONTROL SYSTEM

[75] Inventor: Gilbert H. Drutchas, Birmingham, Mich.

[73] Assignee: TRW Inc., Cleveland, Ohio

[22] Filed: Nov. 7, 1974

[21] Appl. No.: 521,939

[52] U.S. Cl. .................... 180/82 R; 180/105 R; 180/77 R
[51] Int. Cl.² .................................. B60K 31/00
[58] Field of Search ............ 180/105 R, 105 E, 106, 180/107, 108, 109, 82 R, 77 R; 303/21 EB; 318/328; 105/61

[56] References Cited
UNITED STATES PATENTS

| | | | |
|---|---|---|---|
| 2,825,418 | 3/1958 | Kershman | 180/106 |
| 3,053,990 | 9/1962 | Von Berg et al. | 180/109 |
| 3,331,478 | 7/1967 | Trifiletti et al. | 180/105 R |
| 3,502,167 | 3/1970 | Baxter et al. | 180/107 |
| 3,626,919 | 12/1971 | MacMillan | 180/82 R |
| 3,752,249 | 8/1973 | Gelenius et al. | 180/105 E |
| 3,776,355 | 12/1973 | Scherenberg | 180/105 R |
| 3,844,371 | 10/1974 | Garcea | 180/82 R |

FOREIGN PATENTS OR APPLICATIONS

| | | | |
|---|---|---|---|
| 403,476 | 12/1933 | United Kingdom | 180/108 |

*Primary Examiner*—Robert R. Song
*Assistant Examiner*—J. D. Rubenstein

[57] ABSTRACT

An improved acceleration control system is utilized to prevent overspeeding or spinning of engine driven vehicle wheels. The acceleration control system includes a first sensor for detecting variations in the rate of rotation of engine driven wheels and a second sensor for detecting variations in the rate of rotation of nondriven wheels. The two rates of rotation are compared and if the rate of rotation of the driven wheels exceeds the rate of rotation of the nondriven wheels by more than a predetermined amount, a mechanical-hydraulic throttle motion divertor assembly is activated to reduce engine operating speed. The divertor assembly includes a pair of pistons which cooperate with a body of liquid to transmit motion from an accelerator pedal to a throttle linkage. During normal operation of the vehicle, the volume of the body of liquid remains substantially constant and the body of liquid is effective to transmit hydrostatic pressure forces between the two pistons. Upon the occurrence of an excessive rate of rotation of the driven wheels relative to the nondriven wheels, a valve is opened and the volume of the body of liquid is decreased. This results in movement of one of the pistons relative to the other and actuation of the throttle linkage to decrease the engine operating speed.

8 Claims, 4 Drawing Figures

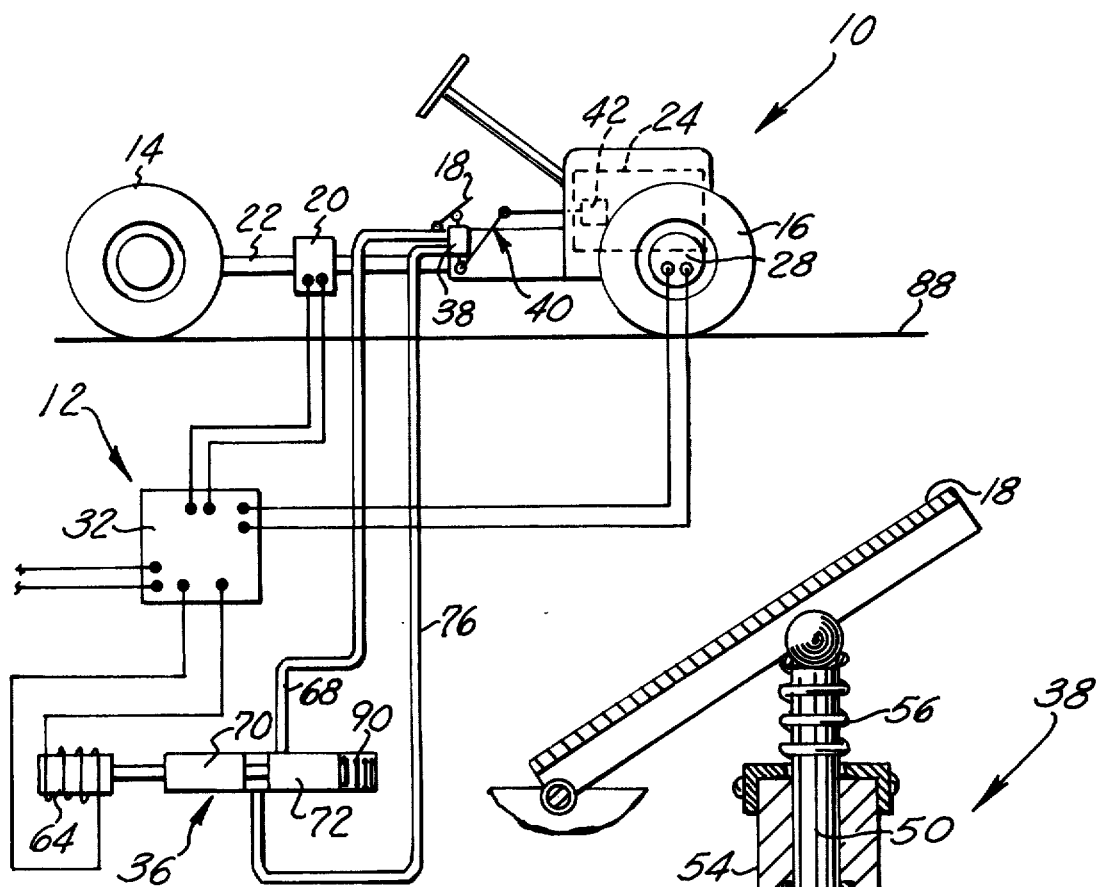
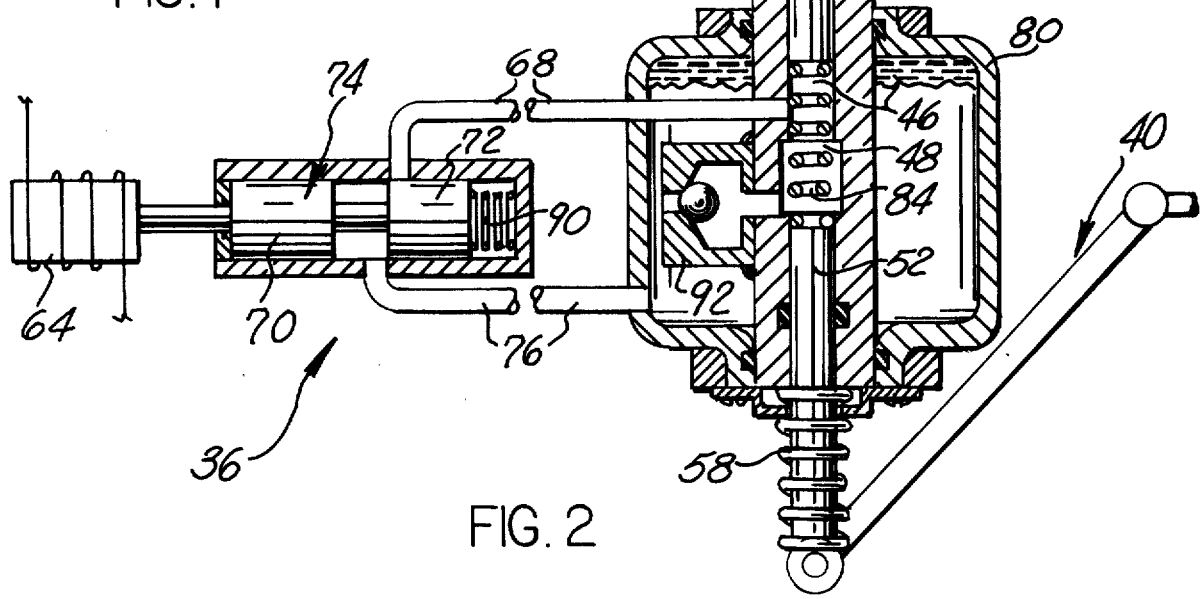
FIG. 1
FIG. 2

ACCELERATION CONTROL SYSTEM

BACKGROUND OF THE INVENTION

This invention relates to an acceleration control system which prevents overspeeding or spinning of driven wheels of a vehicle.

During the operation of a vehicle, a driver may tend to cause the engine driven wheels to overspeed or spin by indiscriminate actuation of the accelerator pedal. When the driven wheels tend to overspeed, excessive slippage occurs between the tires and the road with undesirable tire wear. When this occurs with one of the driven wheels on a surface having a lower co-efficient of friction than the other driven wheel, vehicle stability is lost. In addition, overspeeding or spinning of the driven wheels results in excessive gasoline consumption. Various known acceleration control systems directed to the above problems are disclosed in U.S. Pat. Nos. 3,776,355; 3,752,249; and 3,680,655.

SUMMARY OF THE PRESENT INVENTION

The present invention provides an improved acceleration control system which includes a sensor arrangement to detect the occurrence of an excessive rate of rotation of a driven wheel relative to the rate of rotation of a nondriven wheel. In accordance with the present invention, upon the occurrence of an excessive rate or driven wheel rotation, a valve is opened to reduce the volume of a body of a substantially noncompressible fluid (liquid) disposed between input and output members of an engine throttle actuator linkage. Reducing the volume of the body of liquid results in operation of the throttle actuator linkage to reduce the rate of operation of the engine and the speed at which the wheels of the vehicle are driven. During continued operation of the vehicle without overspeeding of the driven wheels, the volume of the liquid is maintained constant until the accelerator is released to effect a substantial reduction in engine operating speed.

Accordingly, it is an object of this invention to provide a new and improved apparatus for preventing overspeeding or spinning of engine driven wheels of a vehicle.

Another object of this invention is to provide a new and improved apparatus for preventing overspeeding of engine driven wheels of a vehicle and wherein the apparatus includes a throttle actuator linkage wherein a body of liquid transmits hydrostatic pressure forces between two throttle linkage members and a control arrangement is provided to vary the volume of liquid in the body of liquid to effect a decrease in engine output speed in response to detection of excessive overspeeding of an engine driven wheel of a vehicle.

Another object of this invention is to provide a new and improved apparatus for preventing overspeeding or spinning of an engine driven wheel and wherein the apparatus includes a throttle actuator arrangement having a chamber containing a body of fluid which transmits pressure forces between input and output members and a control arrangement, which reduces the volume of fluid in the chamber in response to detection of driven wheel rotation, maintains the volume of fluid in the chamber constant at the reduced volume during continued operation of the vehicle without overspeeding of a driven wheel, and which increases the volume of fluid in the chamber upon releasing of the throttle actuator to decrease engine operating speed.

BRIEF DESCRIPTION OF THE DRAWINGS

The foregoing and other objects and features of the present invention will become more apparent upon a consideration of the following description taken in connection with the accompanying drawings wherein:

FIG. 1 is a schematic illustration of a vehicle having an acceleration control system constructed in accordance with the present invention;

FIG. 2 is an enlarged illustration of a mechanicalhydraulic divertor assembly utilized in the acceleration control system of FIG. 1, the divertor assembly being shown in an initial condition prior to compensation for overspeeding of an engine driven wheel;

DESCRIPTION OF ONE SPECIFIC PREFERRED EMBODIMENT OF THE INVENTION

Figure 3:
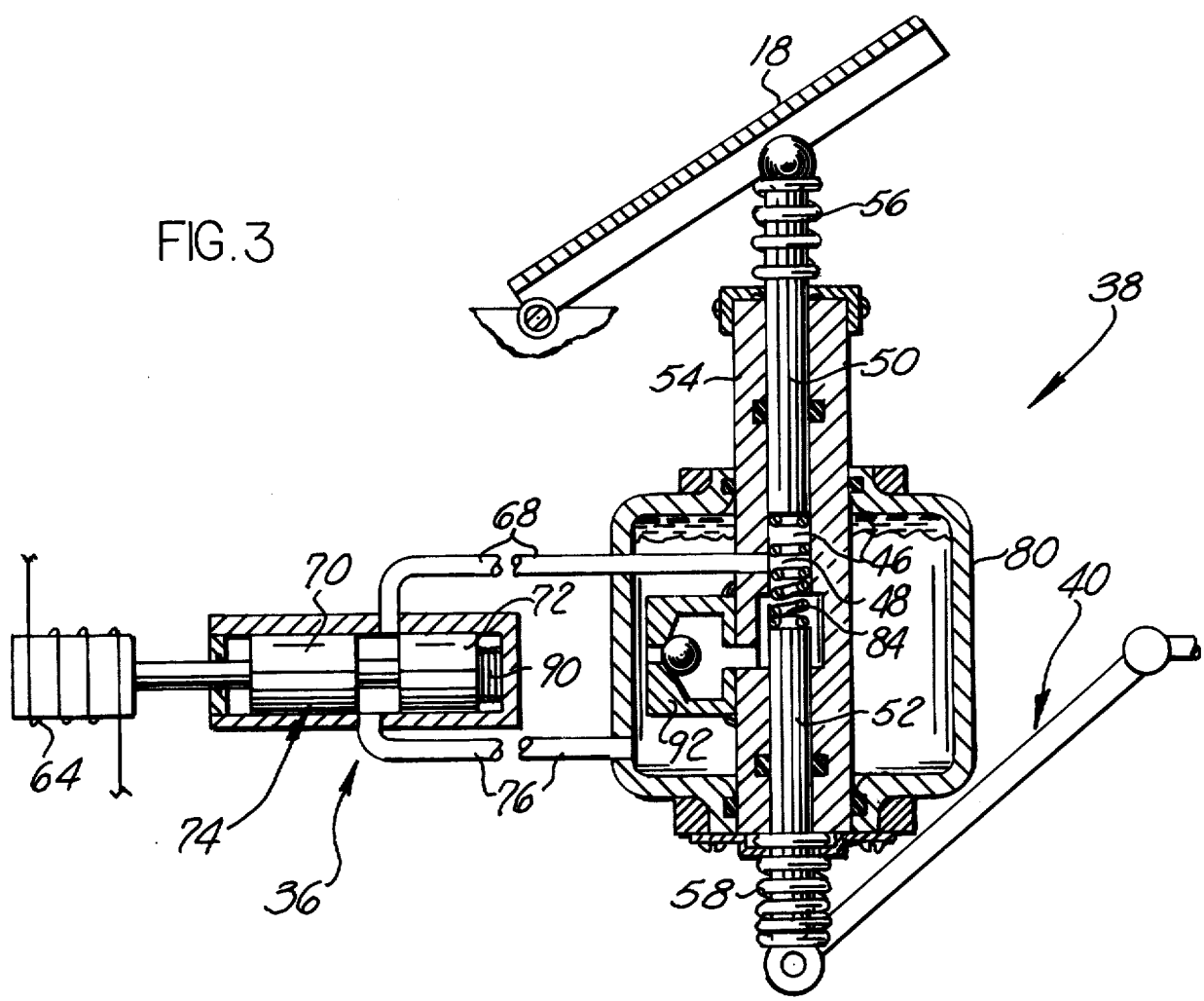
FIG. 3 is an illustration similar to FIG. 2 depicting the condition of the divertor assembly immediately after compensating for oversppeding of an engine driven wheel.

A vehicle 10 having an acceleration control system 12 constructed in accordance with the present invention is illustrated in FIG. 1. The acceleration control system 12 prevents overspeeding or spinning of an engine driven wheel 14 relative to a nondriven wheel 16 upon indiscriminate actuation of an accelerator pedal 18. The acceleration control system 12 includes a driven wheel sensor assembly 20 which senses variations in the speed at which a propeller shaft 22 is rotated by an engine 24 to drive the wheel 14. A nondriven wheel speed sensor assembly 28 senses variations in the rate of rotation of the nondriven wheel 16. Output signals from the two sensor assemblies 20 and 28 are transmitted to a comparator 32.

Upon the occurrence of an excessive rate of rotation of a driven wheel 14 relative to the rate of rotation of a nondriven wheel 16, an output signal from the comparator 32 effects energization of a solenoid valve 36 and operation of a mechanicalhydraulic divertor assembly 38 in a throttle linkage 40. The throttle linkage 40 is constructed so that upon operation of the divertor assembly 38, the butterfly valve in an engine carburetor assembly 42 is moved to reduce the operating speed of the engine 24 and prevent excessive overspeeding or spinning of the driven wheel 14.

The divertor assembly 38 includes a body of a substantially incompressible fluid, liquid 46 (FIG. 2), which is disposed in a generally cylindrical chamber 48. The liquid 46 is a suitable hydraulic fluid or the like. The chamber 48 is located between and defined in part by two throttle linkage members 50, 52. The member 50 comprises an input piston connected with the accelerator pedal 18 and the member 52 comprises an output piston which is connected with the carburetor 42 by parts of the throttle linkage 40.

Upon normal actuation of the accelerator pedal 18 by a driver of the vehicle 10, the body of liquid 46 transmits hydrostatic pressure forces between the input piston 50 and the output piston 52. Thus, as the cylindrical piston 50 is moved axially into a cylindrical sleeve 54 upon depressing of the accelerator pedal 18, the body of liquid 46 applies hydrostatic pressure forces against the output piston 52. These pressure forces move the output piston 52 downwardly to the same extent that the input piston 50 is moved downwardly by the accelerator pedal 18. As the input piston 50 moves downwardly, a return spring 56 is compressed. Also, as the output piston 52 moves out of the stationary cylinder body 54, a second return spring 58 is resiliently stretched.

Upon a releasing of the accelerator pedal 18, the input and output pistons 50 and 52 are moved upwardly from the position shown in FIG. 2, to an unactuated or initial position by the coaxial return springs 56 and 58. Of course, this movement of the pistons 50 and 52 returns the accelerator pedal 18 to its normal or unactuated condition. It should be noted that during this movement of the coaxial pistons 50 and 52 in the stationary cylinder body 54, the volume of the body of liquid 46 is maintained constant so that there is no relative movement between the pistons 50 and 52.

Upon the occurrence of overspeeding of the driven wheel 14 relative to the nondriven wheel 16, a signal from the driven wheel sensor 20 to the comparator 32 indicates a rate of rotation which is greater than the rate of rotation indicated by the signal transmitted from the nondriven wheel sensor 28. The comparator 32 contains a differential amplifier circuit which differentiates and amplifies the speed signals from the two sensors 20 and 28. When the difference between the rotational speed represented by the signals from the sensors 20 and 28 is greater than a base threshold logic signal, a solenoid 64 is energized to effect operation of the valve 36 from the closed condition of FIGS. 1 and 2 to the open condition of FIG. 3.

Upon opening of the valve 36 in response to detection of overspeeding of a driven wheel, fluid flows from the chamber 48 to reduce the volume of liquid in the chamber. Liquid from the chamber 48 flows through a conduit 68, between cylindrical lands 70 and 72 on the valve spool 74 to a conduit 76. The conduit 76 is connected in fluid communication with a sump or reservoir housing 80. This flow of fluid from the chamber 48 enables the output piston 52 to move upwardly from the actuated position shown in FIG. 2 toward an initial or unactuated position under the influence of the biasing spring 58 and against the influence of a spacer spring 84 disposed between the input and output pistons 50 and 52.

The upward movement of the piston 52 actuates the throttle linkage 40 to operate the carburetor 42 and reduce the operating speed of the engine 24. Of course, reducing the operating speed of the engine 24 reduces the speed at which the driven wheel 14 is rotated relative to the road or support suface 88 (FIG. 1) to thereby prevent excessive slipping of the driven wheel 14 relative to the road 88. Once the rate of rotation of the driven wheel 14 has been reduced to correspond to the rate of rotation of the nondriven wheel 16, the comparator 32 de-energizes the solenoid 64. Upon de-energization of the solenoid 64, a valve spring 90 moves the valve spool 70 from the open position of FIG. 3 to the closed position of FIG. 2 to block the flow of liquid from the chamber 48.

After the divertor assembly 38 has been operated to reduce the operating speed of the engine 24 to prevent overspeeding of the driven wheel 14 in the manner previously explained, further depressing of the accelerator 18 results in simultaneous movement of the two pistons 50 and 52 through the same distance to actuate the throttle linkage 40 and carburetor 42 to increase the output speed of the engine 24. Assuming that the accelerator pedal 18 is depressed in a discriminating manner so that overspeeding of the rear wheel 14 is not imminent, the valve 36 remains closed and the volume of liquid in the chamber 48 remains constant. Of course, if the accelerator pedal 18 is indiscriminately depressed so as to tend to cause overspeeding of the driven wheel 14, the valve 36 will again be opened to further reduce the volume of liquid 46 in the chamber 48 with a resulting actuation of the throttle linkage 40 to reduce the operating speed of the engine 24 and the rate of rotation of the driven wheel 14.

After the divertor assembly 38 has been operated to compensate for overspeeding of the driven wheel 14, the divertor assembly remains in the condition shown in FIG. 3 with a reduced volume of liquid 46 in the chamber 48 until the accelerator pedal 18 is subsequently released to effect a substantial reduction in the operating speed of the engine 24. When the accelerator pedal 18 is released, the input and output pistons 50 and 52 are returned to their initial or unactuated positions under the influence of the coaxial biasing springs 56 and 58 and spacer spring 84. As this occurs, the inner end faces of the pistons 50 and 52 move away from each other with a resulting expanding of the chamber 48. As this occurs, liquid flows from the sump or reservoir chamber 80 through a one-way check valve 92 into the chamber 48. It should be noted that the one-way check valve 92 enables fluid to flow from the reservoir chamber 80 into the chamber 48 between the pistons 50 and 52 and prevents an outward flow of liquid from the chamber 48 directly to the reservoir chamber 80.

Figure 4:
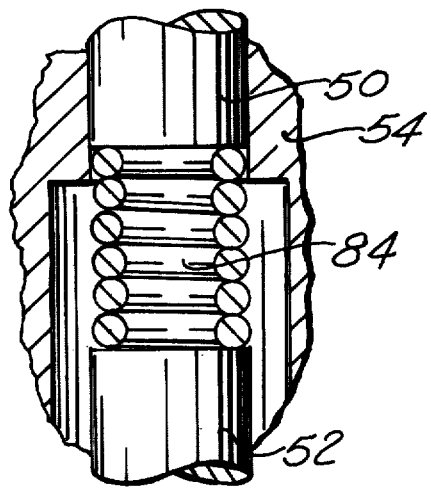
FIG. 4 is a fragmentary sectional view illustrating the relationship between input and output pistons and a spacer spring in the divertor assembly when the divertor assembly is in an override condition.

It is contemplated that under certain operating conditions, it may be desirable to override the divertor assembly 38. This is accomplished by compressing the spacer spring 84 between the input piston 50 and output piston 52 in the manner shown in FIG. 4. When the spacer spring 84 has been fully compressed so that its coils are disposed in abutting engagement, further depressing of the accelerator pedal 18 results in movement of the input piston 50 being transmitted directly through the coil spring 84 to the output piston 52 so that the throttle linkage 40 is actuated to vary the operating speed of the engine 24 directly with movement of the accelerator pedal 18. Of course, at this time the acceleration control system 12 is ineffective to prevent overspeeding or spinning of the driven wheel 14.

In view of the foregoing description, it can be seen that an improved acceleration control system 12 is utilized to prevent overspeeding or spinning of the engine driven wheel 14. The acceleration control system 12 includes a driven wheel sensor 20 for detecting variations in the rate of rotation of the driven wheel and a nondriven wheel speed sensor 28 for detecting variations in the rate of rotation of the nondriven wheel 16. The rates of rotation of the driven wheel 14 and nondriven wheel 16 are compared and if the rate of rotation of the driven wheel exceeds the rate of rotation of the nondriven wheel by more than a predetermined amount, the mechanicalhydraulic throttle motion divertor assembly 38 is activated to reduce the operating speed of the engine 24.

The divertor assembly 38 includes a pair of cylindrical pistons 50 and 52 which cooperate with a body of hydraulic fluid 46 to transmit motion from an accelerator pedal 18 to the carburetor 42 through the throttle linkage 40. During normal operation of the vehicle 10, the volume of liquid 46 in the chamber 48 remains substantially constant and the body of liquid is effective to transmit hydrostatic pressure forces between the coaxial input and output pistons 50 and 52. Upon the occurrence of an excessive rate of rotation of the driven wheel 14 relative to the nondriven wheel 16, the speed comparator 32 energizes the solenoid 64 to effect operation of the valve 36 from the closed condition of FIG. 2 to the open condition of FIG. 3. This exhausts the chamber 48 to the reservoir through the conduits 68 and 76. As fluid flows from the chamber 48, the biasing spring 58 moves the output piston 52 axially inwardly to actuate the throttle linkage 40 and decrease the operating speed of the engine 24.

During subsequent operation of the vehicle without overspeeding of the driven wheel 14, the volume of liquid in the chamber 48 is maintained constant until the accelerator pedal 18 is released to effect a substantial decrease in engine operating speed. When the accelerator pedal is released, the input and output pistons 50 and 52 are moved apart under the influence of the coaxial biasing springs 56 and 58 and spacer spring 84. As the pistons 50 and 52 are moved apart, liquid flows from the sump chamber 80 through the one-way check valve 92 into the chamber 48 until the volume of liquid in the chamber is equal to its original or initial volume.

Although the acceleration control system 12 has been depicted herein as being utilized only to prevent overspeeding or spinning of the driven wheel 14, it is contemplated that the divertor assembly 38 may be utilized to govern or limit the top speed which is obtained by a vehicle. In addition, it is contemplated that the divertor assembly 38 may be utilized in association with speed control systems which maintain the speed of movement of the vehicle 10 along the road 88 substantially constant at a preset speed. If it were desired to utilize the divertor assembly 38 to perform either of these two functions, it is contemplated that additional electrical circuitry would be added to the comparator 32 to provide for controlling of the valve 36 to obtain these functions.

Having described one specific preferred embodiment of the invention, the following is claimed:

1. An apparatus for use in a vehicle having nondriven and engine driven wheels, said apparatus comprising throttle actuator means operable against the influence of a biasing force to increase the operating speed of the engine, said throttle actuator means including input and output members and variable volume chamber means for holding a body of fluid for transmitting pressure forces between said input and output members, said chamber means including surface means for defining a longitudinally extending chamber having openings at opposite ends thereof, said input member extending through one of said openings into said chamber, said output member extending through the other opening into said chamber, said body of fluid being disposed in said chamber between said input and output members, said input member being movable relative to said surface means to effect movement of said output member relative to said surface means under the influence of fluid pressure forces transmitted from said input member to said output member by the body of fluid, sensor means for detecting when the rate of rotation of a driven wheel exceeds the rate of rotation of a nondriven wheel by more than a predetermined amount, and control means for effecting a variation in the volume of said variable volume chamber means from a first volume to a second volume to effect relative movement between said members and a decrease in engine speed in response to detection of a rate of driven wheel rotation which exceeds the rate of nondriven wheel rotation by more than the predetermined amount to thereby decrease the rate at which the driven wheel is rotated by the engine and for maintaining the volume of said chamber means constant at said second volume during continued operation of the vehicle with the rate of rotation of the driven wheel exceeding the rate of rotation of the nondriven wheel by an amount which is less than the predetermined amount.

2. An apparatus as set forth in claim 1 wherein said control means includes means for varying the volume of said chamber means from said second volume to said first volume upon releasing of said throttle actuator means to decrease the engine operating speed.

3. An apparatus as set forth in claim 2 wherein said means for varying the volume of said chamber means from said second volume to said first volume includes spring means for applying a biasing force to said input and output members.

4. An apparatus as set forth in claim 1 wherein said control means includes spring means disposed in said chamber for applying a biasing force to said input and output members urging said input and output members away from each other to thereby increase the volume of said variable volume chamber means from said second volume to said first volume upon operation of said throttle actuator means to further decrease the engine operating speed.

5. An apparatus as set forth in claim 1 wherein said control means includes valve means operable from a first condition to a second condition to port fluid from said chamber means to decrease the volume of said chamber means from said first volume to said second volume in response to detection of a rate of driven wheel rotation which exceeds the rate of nondriven wheel rotation by more than the predetermined amount, said valve means being operable to prevent fluid flow to and from said chamber means during subsequent operation of the vehicle at the decreased engine operating speed and with the rate of rotation of the driven wheel exceeding the rate of rotation of the nondriven wheel by an amount which is less than the predetermined amount.

6. An apparatus for use in a vehicle having driven and nondriven wheels, said apparatus comprising throttle actuator means for varying the operating speed of the engine, said throttle actuator means including an accelerator pedal, wall means defining a longitudinally extending chamber having openings at opposite ends thereof, an input piston connected with said accelerator pedal and extending through one of said chamber openings into sliding engagement with wall means, an output piston extending through the other one of said chamber openings into sliding engagement with said wall means, fluid means for transmitting fluid pressure forces between said input and output pistons to effect movement of said output piston relative to said wall means upon movement of said input piston relative to said wall means, first sensor means for providing an output signal which varies as a function of the rate at which the driven wheels are rotated by the engine, second sensor means for providing a second output signal which varies as a function of variations in the rate of rotation of the nondriven wheel, comparator means for comparing said first and second signals and providing a third signal which varies as a function of variations in the difference between said first and second signals, valve means connected in fluid communication with said chamber and operable between a closed condition blocking a flow of fluid from the body of fluid disposed between said input and output pistons and an open condition enabling fluid to flow from the body of fluid between said input and output pistons to enable at least one of said pistons to move relative to said wall means, and means for effecting operation of said valve means from said closed condition to said open condition in response to said third signal.

7. An apparatus as set forth in claim 6 further including resiliently compressible spring means disposed between said input and output pistons, said input piston being movable relative to said output piston to compress said spring means and effect movement of said output piston to increase engine operating speed when said valve means is in the open condition.

8. An apparatus as set forth in claim 6 further including reservoir means for holding a supply of fluid, first conduit means for conducting fluid from said control valve means to said reservoir means when said valve means is in the open condition, second conduit means for conducting fluid from said reservoir means to said chamber, and second valve means for blocking fluid flow from said chamber to said reservoir.

* * * * *